(12) United States Patent
Inoue et al.

(10) Patent No.: US 10,924,492 B2
(45) Date of Patent: Feb. 16, 2021

(54) INFORMATION LEAKAGE PREVENTION SYSTEM AND METHOD

(71) Applicant: HITACHI SOLUTIONS, LTD., Tokyo (JP)

(72) Inventors: Atsuo Inoue, Tokyo (JP); Yuzo Oshida, Tokyo (JP); Tateki Harada, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 420 days.

(21) Appl. No.: 15/753,249

(22) PCT Filed: Nov. 25, 2016

(86) PCT No.: PCT/JP2016/085003
§ 371 (c)(1),
(2) Date: Feb. 16, 2018

(87) PCT Pub. No.: WO2017/110363
PCT Pub. Date: Jun. 29, 2017

(65) Prior Publication Data
US 2018/0241758 A1    Aug. 23, 2018

(30) Foreign Application Priority Data
Dec. 25, 2015  (JP) .............................. JP2015-254597

(51) Int. Cl.
G06F 17/00        (2019.01)
H04L 29/06        (2006.01)
(Continued)

(52) U.S. Cl.
CPC .......... *H04L 63/105* (2013.01); *G06F 21/554* (2013.01); *G06F 21/60* (2013.01);
(Continued)

(58) Field of Classification Search
None
See application file for complete search history.

(56) References Cited

U.S. PATENT DOCUMENTS 7,069,316 B1 *   6/2006  Gryaznov ........... H04L 63/1425
                                                    709/224
9,197,664 B1 *  11/2015  Aziz ..................... G06F 21/554
(Continued)

FOREIGN PATENT DOCUMENTS

JP         2012-015684 A       1/2012

OTHER PUBLICATIONS

International Search Report of PCT/JP2016/085003 dated Feb. 28, 2017.

*Primary Examiner* — Phy Anh T Vu
(74) *Attorney, Agent, or Firm* — Mattingly & Malur, PC

(57) ABSTRACT

Provided is an information leakage prevention technique which does not require a dedicated device for access management on a network, and which offers excellent security policy flexibility. An information leakage prevention system comprises: a client terminal including a client processing unit which performs network control in accordance with an acquired security policy; and a management server including a user database in which information concerning a user of the client terminal is stored, a security policy database in which a security policy defining a network control content for each attribute of the user is stored, and a server processing unit which selects the security policy on the basis of the attribute of the user and a time of delivery of the security policy, and which transmits the selected security policy to the corresponding client terminal.

10 Claims, 13 Drawing Sheets

110

| Affiliation - 301 | Position - 302 | Time - 303 | Operation during policy application - 304 |
|---|---|---|---|
| Sales department | Section chief | 00:00～24:00 | Prohibit connection to C&C server |
| Design department | Foreman | 00:00～09:00 | Prohibit connection to network |
| Design department | Foreman | 09:00～18:00 | Prohibit connection to C&C server |
| Design department | Foreman | 18:00～24:00 | Prohibit connection to network |
| Design department | General | 00:00～24:00 | Prohibit connection to network |

(51) Int. Cl.
  *G06F 21/60*    (2013.01)
  *G06F 21/55*    (2013.01)
  *H04L 12/24*    (2006.01)
  *G06F 21/56*    (2013.01)

(52) U.S. Cl.
  CPC .......... *H04L 41/0893* (2013.01); *H04L 41/28* (2013.01); *H04L 63/102* (2013.01); *H04L 63/1416* (2013.01); *H04L 63/20* (2013.01); *G06F 21/56* (2013.01)

(56) References Cited

U.S. PATENT DOCUMENTS

| | | | |
|---|---|---|---|
| 9,294,486 B1* | 3/2016 | Chiang | H04L 63/145 |
| 9,705,911 B2* | 7/2017 | Li | H04L 63/1441 |
| 9,922,191 B1* | 3/2018 | Grafi | G06F 21/564 |
| 2002/0116639 A1* | 8/2002 | Chefalas | G06F 21/56 |
| | | | 726/24 |
| 2009/0328221 A1* | 12/2009 | Blumfield | G06F 21/564 |
| | | | 726/24 |
| 2012/0005743 A1 | 1/2012 | Kitazawa et al. | |
| 2014/0310811 A1* | 10/2014 | Hentunen | H04L 61/305 |
| | | | 726/23 |
| 2015/0319187 A1* | 11/2015 | Huang | G06F 3/0488 |
| | | | 726/25 |
| 2019/0228154 A1* | 7/2019 | Agrawal | G06F 21/56 |

\* cited by examiner

| User name - 201 | Affiliation - 202 | Position - 203 | IP address - 204 |
|---|---|---|---|
| User1 | Sales department | Section chief | 192.168.1.101 |
| User2 | Design department | Foreman | 192.168.2.101 |
| User3 | Design department | General | 192.168.2.102 |
| . . . | | | |

| Affiliation - 301 | Position - 302 | Time - 303 | Operation during policy application - 304 |
|---|---|---|---|
| Sales department | Section chief | 00:00~24:00 | Prohibit connection to C&C server |
| Design department | Foreman | 00:00~09:00 | Prohibit connection to network |
| Design department | Foreman | 09:00~18:00 | Prohibit connection to C&C server |
| Design department | Foreman | 18:00~24:00 | Prohibit connection to network |
| Design department | General | 00:00~24:00 | Prohibit connection to network |
| . . . | | | |

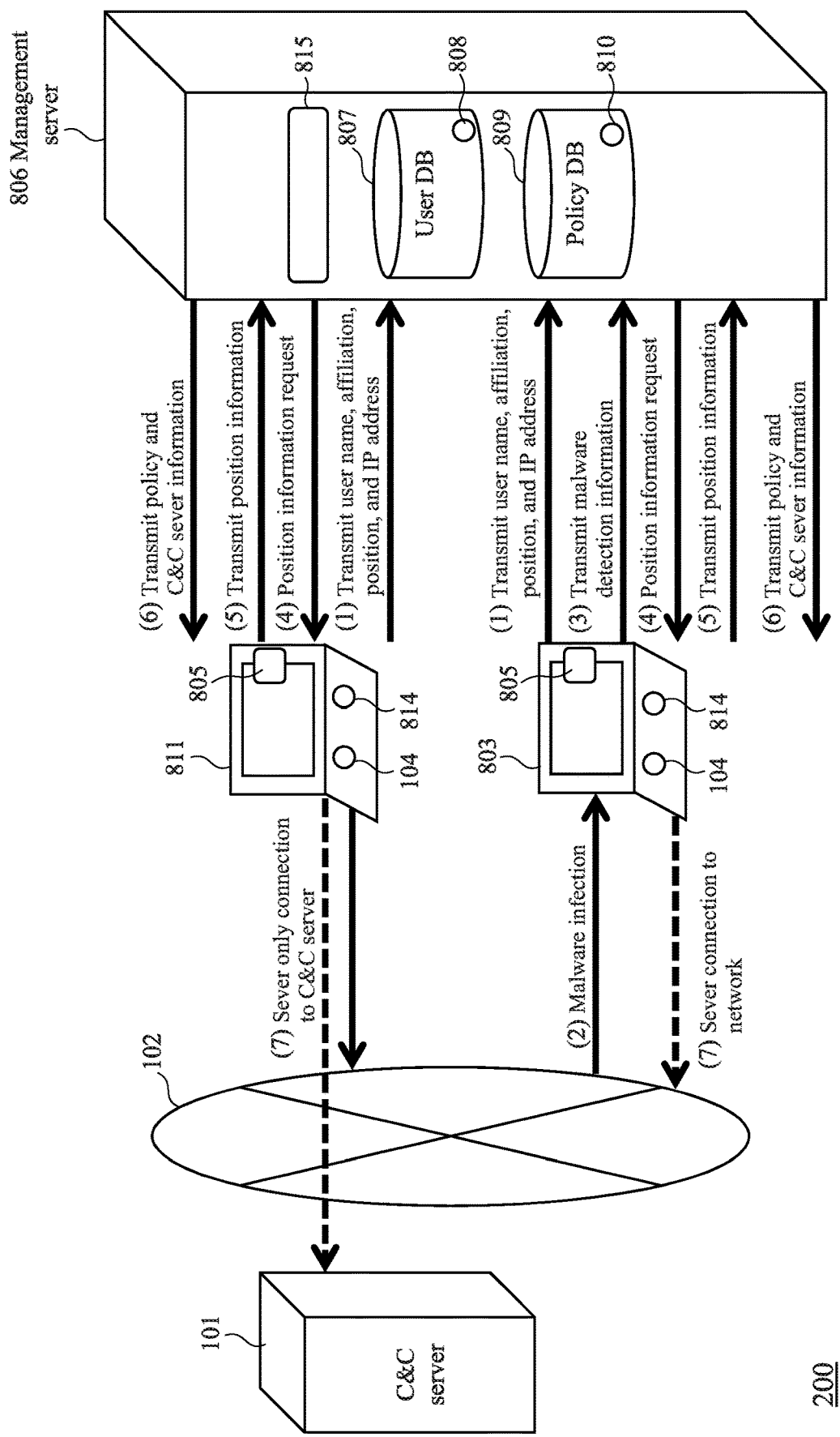

| User name - 901 | Affiliation - 902 | Position - 903 | IP address - 904 | Position information - 905 |
|---|---|---|---|---|
| User1 | Sales department | Section chief | 192.168.1.101 | In office |
| User2 | Design department | Foreman | 192.168.2.101 | At client |
| User3 | Design department | General | 192.168.2.102 | In office |
| . . . | | | | |

| Affiliation - 1001 | Position - 1002 | Time - 1003 | Position information - 1004 | Operation during policy application - 1005 |
|---|---|---|---|---|
| Sales department | Section chief | 00:00~24:00 | In office | Prohibit connection to C&C server |
| Sales department | Section chief | 00:00~24:00 | At client | Prohibit connection to C&C server |
| Design department | Foreman | 09:00~18:00 | In office | Prohibit connection to C&C server |
| Design department | Foreman | 09:00~18:00 | At client | Prohibit connection to network |
| . . . | | | | |

| User name - 1401 | Affiliation - 1402 | Position - 1403 | IP address - 1404 | Attendance information - 1405 |
|---|---|---|---|---|
| User1 | Sales department | Section chief | 192.168.1.101 | In attendance |
| User2 | Design department | Foreman | 192.168.2.101 | - |
| User3 | Design department | General | 192.168.2.102 | - |
| ⋮ | | | | |

| Affiliation - 1501 | Position - 1502 | Time - 1503 | Number of administrators in attendance - 1504 | Operation during policy application - 1505 |
|---|---|---|---|---|
| Sales department | Section chief | 00:00~24:00 | 1 or more | Prohibit connection to C&C server |
| Design department | Foreman | 09:00~18:00 | 2 or more | Prohibit connection to C&C server |
| Design department | Foreman | 09:00~18:00 | Not more than 1 | Prohibit connection to network |
| ⋮ | | | | |

…

INFORMATION LEAKAGE PREVENTION SYSTEM AND METHOD

TECHNICAL FIELD

The present disclosure relates to an information leakage prevention technique for preventing information leakage due to malware, for example.

BACKGROUND ART

Various techniques are available in the event of detection by anti-malware software of malware infection. For example, Patent Literature 1 discloses a technique for preventing damage by blocking connection from a client machine infected with malware to a C&C server, or for isolating the infected client machine from a network. According to the technique disclosed in Patent Literature 1, upon detection of traffic anomaly, packets directed to a specific address are blocked using a firewall device and a relay device.

CITATION LIST

Patent Literature

Patent Literature 1: JP 2012-015684 A

SUMMARY OF INVENTION

Technical Problem

However, the technique according to Patent Literature 1 presupposes the presence of a firewall device and a relay device between an external network and a client machine, where the client machine needs to be installed in a specific internal network in which the firewall device and the relay device are present. Accordingly, the technique is unable to prevent information leakage from a client machine positioned outside the internal network.

In addition, according to the technique of Patent Literature 1, access to the outside is uniformly limited with the use of a firewall device and a relay device. Accordingly, only the same level of countermeasure can be taken with respect to all of the client machines present in the internal network. Further, the technique is not adapted for taking flexible measures, such as mitigating the use restrictions imposed on the users by allowing for modification of the security strength depending on the user of each client machine, and permitting network connection within a range considered to be safe.

Solution to Problem

In order to solve the problem, the present disclosure adopts the configurations set forth in the claims, for example. The present description includes a plurality of means for solving the problem, of which one is an information leakage prevention system including: a client terminal with a client processing unit which performs network control in accordance with an acquired security policy; and a management server including a user database in which information concerning a user of the client terminal is stored, a security policy database in which a security policy defining a network control content for each attribute of the user is stored, and a server processing unit which, on the basis of the attribute of the user and a time of delivery of the security policy, selects the security policy and transmits the selected security policy to the corresponding client terminal.

Advantageous Effects of Invention

According to the present disclosure, even in a network without a firewall device or a relay device, it becomes possible to block information transmission from a client terminal to a C&C server or to isolate the client terminal from a network. In addition, according to the present disclosure, it becomes possible to change the strength of a security policy in accordance with the attribute of the user of the client terminal. Other problems, configurations, and effects will become apparent from the following description of embodiments.

BRIEF DESCRIPTION OF DRAWINGS

FIG. 2 is a diagram for describing the structure of data stored in a user database (the first embodiment).

FIG. 3 is a diagram for describing the structure of data stored in a security policy database (the first embodiment).

FIG. 8 is a diagram illustrating an overall configuration of a system according to the second embodiment.

FIG. 9 is a diagram for describing the structure of data stored in a user database (the second embodiment).

FIG. 10 is a diagram for describing the structure of data stored in a security policy database (the second embodiment).

FIG. 14 is a diagram for describing the structure of data stored in a user database (the third embodiment).

FIG. 15 is a diagram for describing the structure of data stored in a security policy database (the third embodiment).

DESCRIPTION OF EMBODIMENTS

In the following, embodiments of the present disclosure will be described with reference to the drawings. The mode for carrying out the present disclosure is not limited to the following examples, and various modifications may be made within the technical concept of the present disclosure.

(1) First Embodiment

(1-1) System Configuration

Figure 1:
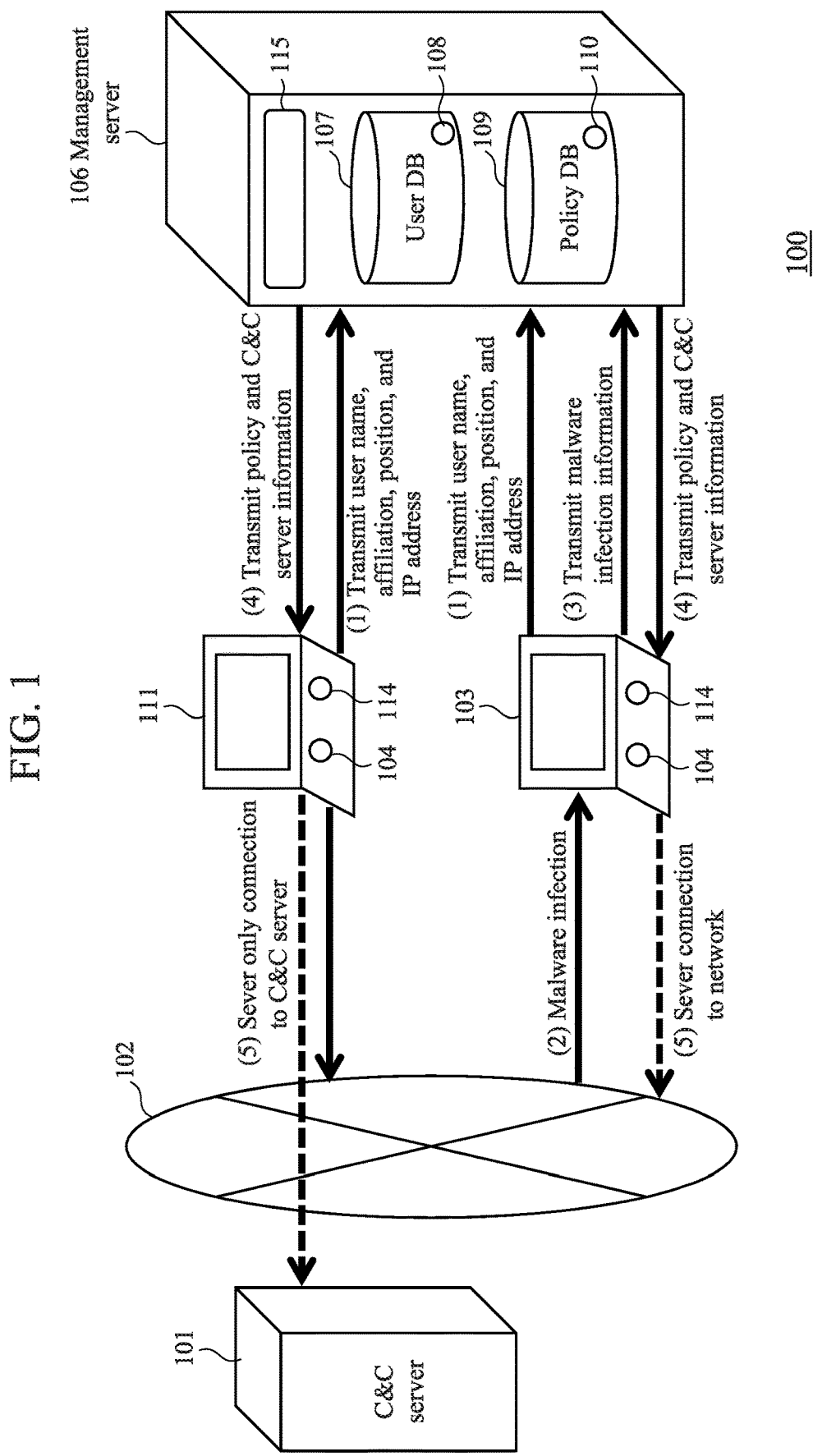
FIG. 1 is a diagram illustrating an overall configuration of a system according to the first embodiment.

FIG. 1 illustrates the overall configuration of an information leakage prevention system 100 according to the present embodiment. The information leakage prevention system 100 is a system which, based on a cooperation of a client machine and a management server, controls network connection of the client machine or an access thereof to a C&C server to prevent information leakage by malware infection.

The information leakage prevention system 100 includes a management server 106 and client machines 103 and 111. The management server 106 and the client machines 103 and 111 are connected via a network 102. While in FIG. 1, only the client machines 103 and 111 are depicted, the number of the client machines may be arbitrarily determined.

Each of the client machines 103 and 111 includes a computer as a basic configuration and is constituted by a CPU, a RAM, a ROM, a hard disk device, a network interface, a display device and the like. In the present embodiment, the client machines 103 and 111 implement anti-malware software 104 and a client processing unit 114 of which the functions are provided through the execution of a program by the CPU. The anti-malware software 104 is a program for detecting malware infection.

The client processing unit 114 includes a user information transmission function, a malware detection information transmission function, and a network control function. The user information transmission function is used for transmitting user information. The malware detection information transmission function is used for transmitting malware detection information. The network control function controls connection or disconnection with the network and the like.

The management server 106 includes a computer as a basic configuration and is constituted by a CPU, a RAM, a ROM, a hard disk device, a network interface and the like. To the management server 106, a display device may be connected as needed. In the present embodiment, the management server 106 implements a user database (database) 107, a security policy database (DB) 109, and a server processing unit 115.

The server processing unit 115, through the execution of a program by the CPU, provides a user information management function, a security policy management function, and a security policy transmission function. The user information management function manages the user database 107. The security policy management function manages the security policy database 109. The security policy transmission function is used for transmitting a security policy.

In the user database 107, data 108 are stored, including the user name (or identifier), affiliation, and position of each user, and the IP address of the client machine. In the present description, these items of information may be collectively referred to as "information concerning a user". The user name (or identifier), affiliation, and position of each user may be collectively referred to as "user information". Further, in the present embodiment, the affiliation, position, and the time of delivery of a policy of each user may be collectively referred to as "attribute". In the security policy database 109, data 110 describing affiliation, position, the time of delivery of policy, the operation during policy application and the like are stored.

In the following, the outline of communications or operations that are performed in the information leakage prevention system 100 will be described. The operations 1 to 5 described below correspond to (1) to (5) in the drawings.

Operation 1

The client machines 103 and 111 started up by the user transmit the user information registered in advance (user name, affiliation, and position) and the IP addresses of the client machines (upon startup) to the management server 106. If any of the registered user name, affiliation, position, or IP address has been modified, the client machines 103 and 111 transmit the user name, affiliation, position, or IP address after modification (after an update) to the management server 106. The management server 106, upon receiving the information about the user name, affiliation, position, and IP address of each user from the client machines 103 and 111, stores the information in the user database 107.

Operations 2 and 3

For example, if the client machine 103 is infected with malware, the client machine 103 transmits malware detection information output from the anti-malware software 104 to the management server 106. The malware detection information includes detection date/time and information of the C&C server with which the malware communicates.

Operation 4

The management server 106, upon reception of the malware detection information, extracts the C&C server information from the detection information. The management server 106 then identifies the current time for policy delivery, and searches the data 110 stored in the security policy database 109 using the identified current time. In this case, the management server 106 selects a security policy registered with respect to the combination of affiliation and position associated with the current time. The management server 106 also extracts from the data 108 stored in the user database 107 each IP address corresponding to the combination of affiliation and position associated with the current time, and transmits to the IP address the security policy and C&C server information corresponding to each user. In this case, the transmission destination is not limited to the client machine 103 infected with malware. In the case of FIG. 1, both of the client machines 103 and 111 are transmission destinations for the security policy and the C&C server information.

Operation 5

Having received the security policy and C&C server information, the client machines 103 and 111 sever connection with the C&C server 101 or sever connection with the network 102, in accordance with the content of the security policy received. In the case of FIG. 1, the client machine 103 severs connection with the network 102, and the client machine 111 severs connection only with the C&C server 101 (and maintains connection with the network).

(1-2) Configuration of User Database

FIG. 2 illustrates a structure example of the data 108 stored in the user database 107. The user database 107 includes the data items of each user's user name 201, affiliation 202, position 203, and IP address 204 of the client machine. These items of information are transmitted from the client machines 103 and 111 to the management server 106 upon startup, and stored by the management server 106 in corresponding item positions.

If the received user name 201 is already registered in the user database 107, the management server 106 overwrites the information of the affiliation 202, position 203, and IP address 204 linked with the existing user name 201 with the newly received information. If the received user name 201 is not registered in the user database 107, the management server 106 stores the received user name 201, affiliation 202, position 203, and IP address 204 in a new row. The administrator of the management server 106 may delete an unwanted row from the user database 107.

(1-3) Configuration of Security Policy Database

FIG. 3 illustrates a structure example of the data 110 stored in the security policy database 109. The security policy database 109 includes the data items of affiliation 301, position 302, time 303 of policy delivery, and operation 304 during policy application.

The management server 106, upon reception of the malware detection information from any of the client machines 103 and 111, searches the security policy database 109 using the current time for policy delivery, and selects a security policy (operation 304 during policy application) to be applied to a user (identified by each combination of the affiliation 301 and the position 302) included in the time 303 including the current time.

If the combination of the affiliation 301 and position 302 linked with the time 303 including the current time for policy delivery is not registered in the security policy database 109, the management server 106 assumes that the operation 304 during policy application is "prohibit network connection", and delivers the policy to all of the client machines being managed. The "prohibit network connection" is the strictest operation. The administrator of the management server 106 may set the operation 304 during policy application for each combination of the affiliation 301, position 302 and time 303, and may also modify or delete the data after the setting.

(1-4) Processing Operation (1-4-1) Operation Upon Startup of the Client Machine

Figure 4:
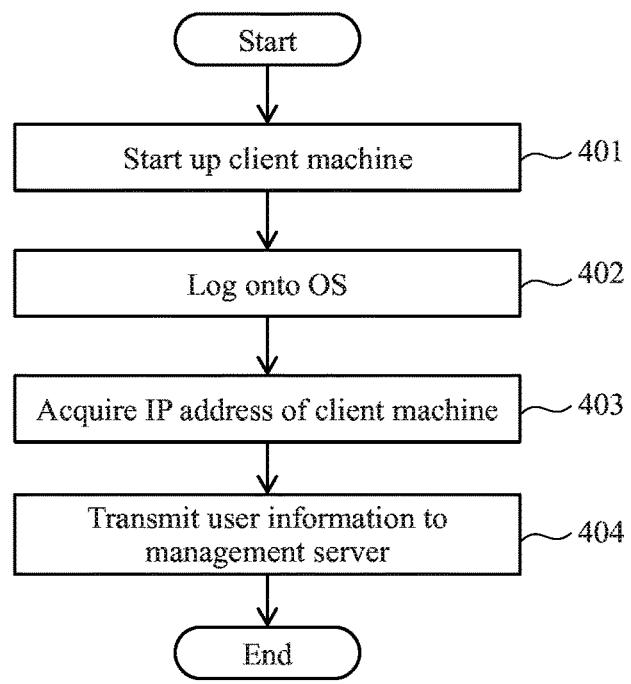
FIG. 4 is a flowchart for describing a processing procedure upon startup of a client machine (the first embodiment).

FIG. 4 illustrates a processing procedure performed in the client machines 103 and 111 upon startup of the client machines. When the client machines 103 and 111 are started by the user (step 401), the client processing unit 114 logs onto the operation system (OS) (step 402). The client processing unit 114 then acquires its own IP address (step 403). The client processing unit 114 transmits the IP address acquired in step 403 and the user information of the user registered in advance (user name, affiliation, and position information) to the management server 106 (step 404).

Figure 5:
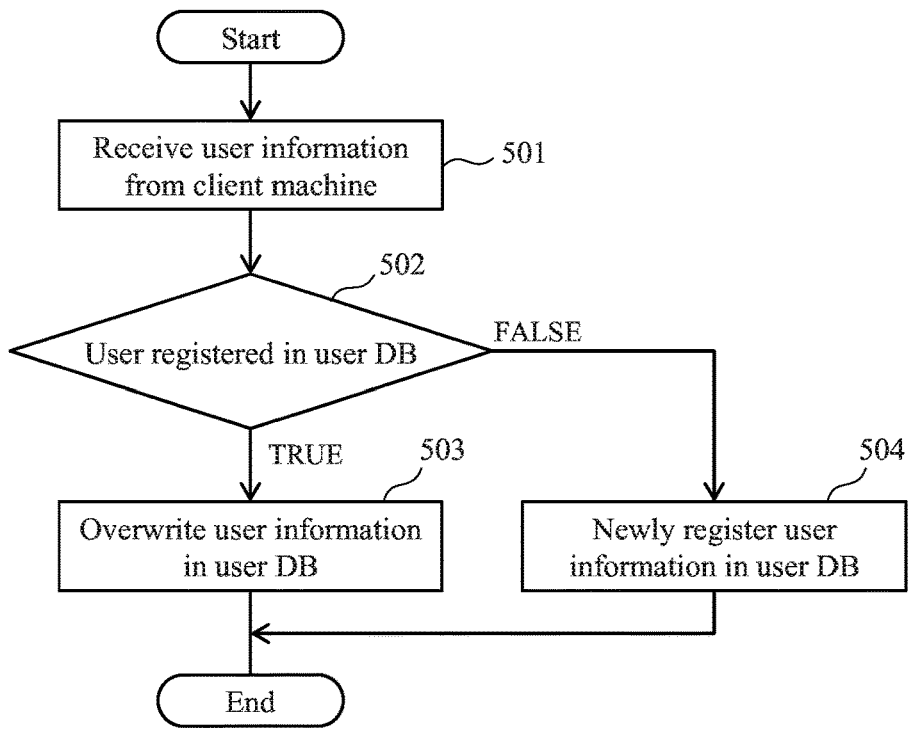
FIG. 5 is a flowchart for describing a processing procedure for a management server upon startup of a client machine (the first embodiment).

FIG. 5 illustrates a processing procedure performed by the client machines management server 106 upon startup. The server processing unit 115 of the management server 106 receives IP address and user information from the client machines 103 and 111 (step 501). The user information is the user information transmitted in step 404. The server processing unit 115 then determines whether the user name included in the received user information is registered in the user database 107 (step 502). If the user name is registered in the user database 107, the server processing unit 115 overwrites and updates the information of the affiliation 202, position 203, and IP address 204 associated with the user name with the content of the received user information (step 503). If the user name is not registered in the user database 107, the server processing unit 115 newly registers the content of the received user information in the user database 107 (step 504).

(1-4-2) Operation During Malware Infection

Figure 6:
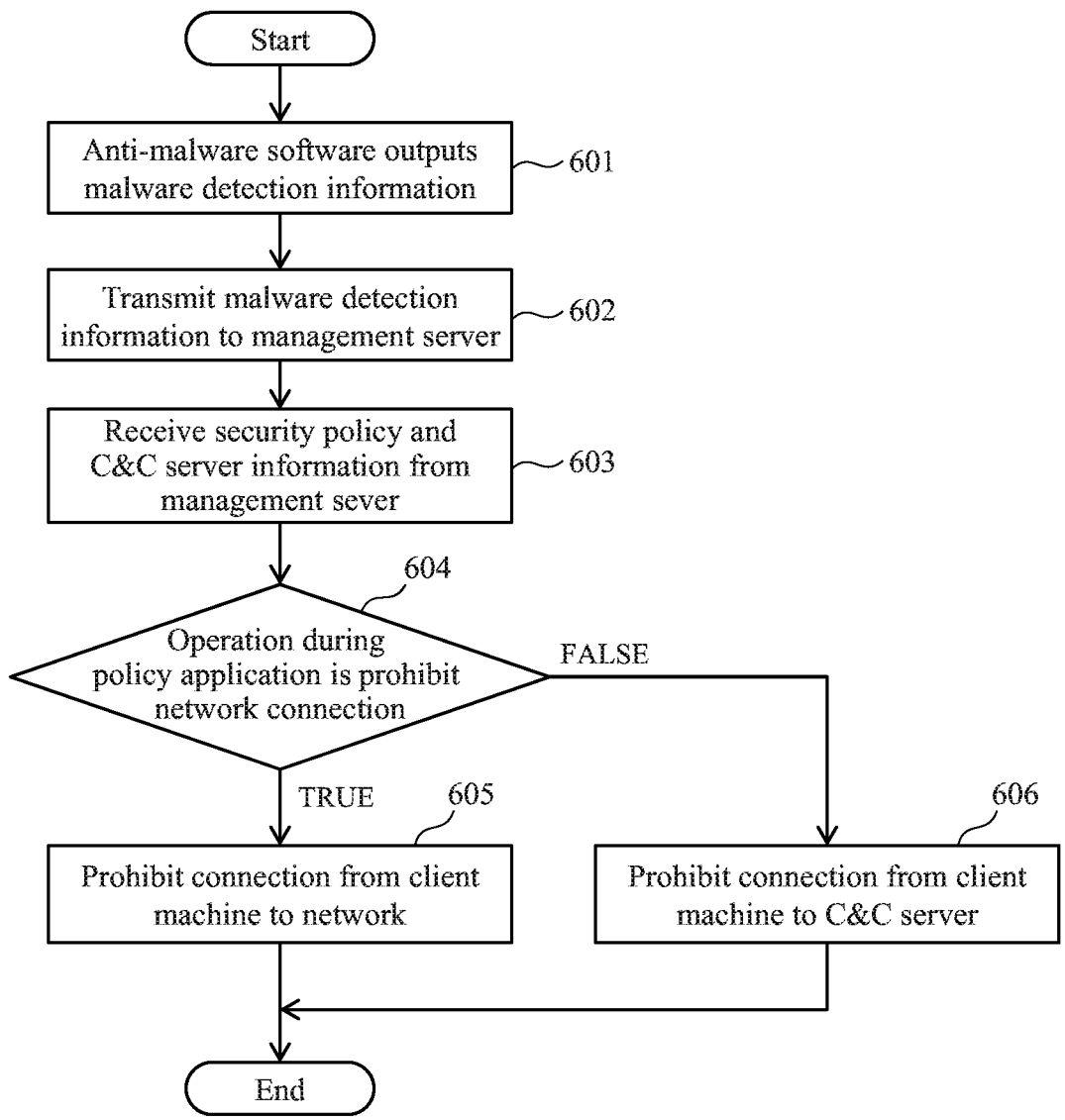
FIG. 6 is a flowchart for describing a processing procedure for a client machine during malware infection (the first embodiment).

FIG. 6 illustrates a processing procedure performed by the client machine 103 infected with malware. Malware infection is detected by the anti-malware software 104 running in the client machine 103. Upon detection of malware infection, the anti-malware software 104 outputs malware detection information (step 601). Then, the client processing unit 114 of the client machine 103 transmits the malware detection information to the management server 106 (step 602).

Thereafter, the client processing unit 114 receives from the management server 106 a security policy and C&C server information (step 603). In this case, the client processing unit 114 determines whether the operation during policy application included in the received security policy is "prohibit network connection" or "prohibit C&C server connection" (step 604). If the operation during policy application is "prohibit network connection", the client processing unit 114 severs connection with the network 102, and isolates itself from the network (step 605). On the other hand, if the operation during policy application is "prohibit C&C server connection", the client processing unit 114 prohibits connection only with respect to the address of the C&C server 101 included in the received C&C server information (step 606). In the client machine 111 that is not infected with malware, the operation subsequent to step 603 is performed.

Figure 7:
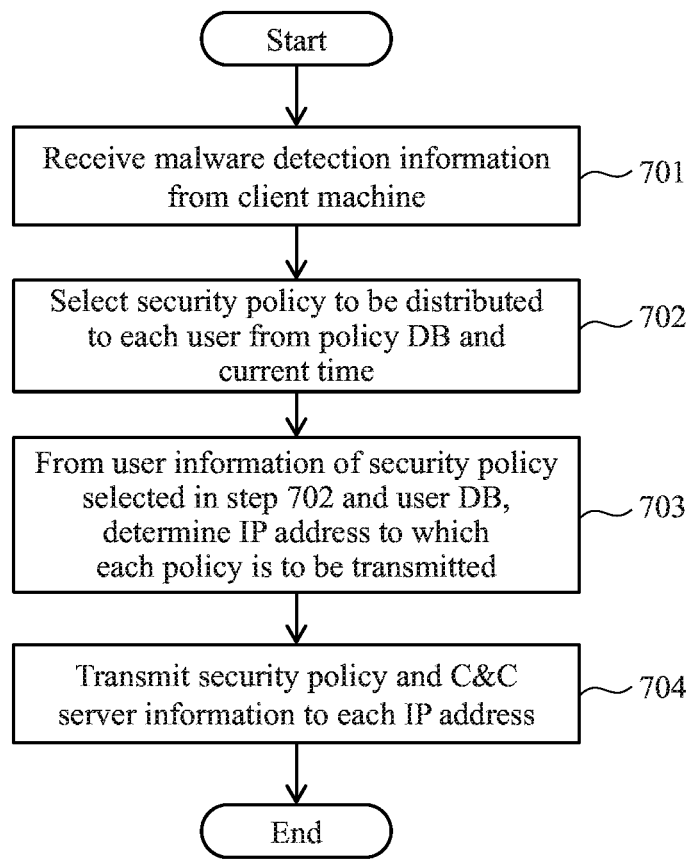
FIG. 7 is a flowchart for describing a processing procedure for a management server during malware infection (the first embodiment).

FIG. 7 illustrates a processing procedure performed by the management server 106 notified of malware infection. The server processing unit 115 receives the malware detection information from the client machine 103 (step 701). The malware detection information is the malware detection information transmitted in step 602. The server processing unit 115 then searches the policy database 109 on the basis of the current time for policy delivery, and selects, for each combination of affiliation and position that has the time 303 including the current time, a security policy for delivery (operation 304 during policy application) (step 702), where a plurality of combinations may be selected.

The server processing unit 115 then compares the combination of affiliation and position identifying the user for which the security policy has been selected, with the combinations of affiliation and position in the user database 107, and determines the IP address of the transmission destination of the security policy for delivery to each user (step 703). Thereafter, the server processing unit 115 transmits the corresponding security policy and the C&C server information to the determined IP address (step 704). The security policy and the C&C server information herein are the security policy and the C&C server information that the client machine received in step 603.

(1-5) Summary

As described above, while the network 102 constituting the information leakage prevention system 100 of the present embodiment does not include a firewall device or a relay device, the information transmission from the client machines 103 and 111 to the C&C server 101 can be blocked, or the client machines 103 and 111 can be isolated from the network 102. The security policy applied to the client machines 103 and 111 (operation during policy application) can be determined in accordance with the combination of affiliation and position of the user. That is, the strength of the security policy can be changed in accordance with the attributes of the user of the client machines 103 and 111.

(2) Second Embodiment (2-1) System Configuration

In the present embodiment, a system will be described in which the security policy is determined by taking position information of the client machine into consideration, and network connection of the client machine and access to the C&C server are controlled to prevent information leakage. FIG. 8 illustrates the overall configuration of an information leakage prevention system 200 according to the present embodiment. In FIG. 8, portions corresponding to those of FIG. 1 are designated with identical or similar reference signs. As will be appreciated from FIG. 8, the basic configuration of the information leakage prevention system 200 is the same as that of the information leakage prevention system 100 according to the first embodiment.

Each of client machines 803 and 811 has a computer as a basic configuration and is constituted by a CPU, a RAM, a ROM, a hard disk device, a network interface and the like. In the case of the present embodiment, the client machines 803 and 811 implement the anti-malware software 104 and a client processing unit 814 of which the functions are provided through the execution of a program by the CPU. The client machines 803 and 811 of the present embodiment further implement a GPS terminal 805. The GPS terminal 805 may be provided externally to the client machine 803. The GPS terminal 805 acquires physical position information (latitude, longitude, and height) of the client machines 803 and 811.

The client processing unit 814 provides a user information transmission function, a position information processing function, a malware detection information transmission function, and a network control function, through the execution of a program by the CPU. The functions are the same as those of the first embodiment with the exception of the position information processing function. The position information processing function, in accordance with a request for position information, acquires the current position information from the GPS terminal 805, and transmits the current position information to the source of the request (management server 806). If the client processing unit 814 includes a table for converting the physical position information into managerial position information (such as in office, outside office, with client, or in company housing), the managerial position information may be transmitted as the position information. The table used for the conversion may be registered in the client processing unit 814 in advance, or may be notified from the management server 806.

The management server 806 has a computer as a basic configuration and is constituted by a CPU, a RAM, a ROM, a hard disk device, a network interface and the like. To the management server 106, a display device may be connected, as needed. In the present embodiment, the management server 806 implements a user database (database) 807, a security policy database (DB) 809, and a server processing unit 815.

The server processing unit 815 provides a user information management function, a position information management function, a security policy management function, and a security policy transmission function, through the execution of a program by the CPU. The functions are the same as those of the first embodiment with the exception of the position information management function. The position information management function, upon reception of malware detection information, requests the current position information from the client machines 803 and 811. The position information management function, upon reception of position information from the client machines 803 and 811, registers the received position information in the user database 807. The position information management function, when GPS information output from the GPS terminal 805 is received as position information as is, converts the GPS information as the physical position information into managerial position information, and registers the managerial position information in the user database 807. The position information management function may implement a function for transmitting to the client machines 803 and 811 a table for converting GPS information into managerial position information.

In the present embodiment, the server processing unit 815 of the management server 806, upon reception of malware detection information, extracts C&C server information from the malware detection information. The server processing unit 815 also searches data 810 in the security policy database 809 on the basis of the current time for policy delivery. In this case, the management server 806 selects a combination of a security policy candidate and position information that is registered with respect to the combination of affiliation and position associated with the current time. The management server 806 also compares the position information of the selected combination with the received position information, and determines a security policy corresponding to the combination including the matching position information as the security policy to be applied to the relevant user. The management server 806 also extracts from the user database 807 the IP address corresponding to the affiliation and position of the determined combination, and transmits to the IP address the security policy and C&C server information corresponding to each user.

(2-2) Configuration of User Database

FIG. 9 illustrates a structure example of data 808 stored in the user database 807. The user database 807 includes the data items of each user's user name 901, affiliation 902, position 903, IP address 904 of the client machine, and position information 905. Information other than the position information 905 is transmitted from the client machines 803 and 811 to the management server 806 upon startup, and stored by the management server 806 in the user database 807.

If the received user name 901 is already registered in the user database 807, the management server 806 overwrites the information of affiliation 902, position 903, and IP address 904 linked with the existing user name 901 with the newly received information. If the received user name 901 is not registered in the user database 807, the management server 806 stores the received user name 901, affiliation 902, position 903, and IP address 904 in a new row.

The management server 806, upon reception of the position information 905 from the client machines 803 and 811, searches the user database 807 using the IP address 904 of the source of transmission of the position information 905, and stores the received position information 905 in a row corresponding to the IP address 904. In the present embodiment, in the position information 905, managerial position information is recorded.

The client machines 803 and 811, upon startup and upon IP address modification, transmits the user information to the management server 806. Accordingly, the IP address 904 of the source of transmission of the position information 905 is stored in the user database 807 without fail. That is, the case in which the IP address 904 of the source of transmission of the position information 905 is not stored in the user database 807 is not contemplated.

(2-3) Configuration of Security Policy Database

FIG. 10 illustrates a structure example of the data 810 stored in the security policy database 809. The security policy database 809 includes the data items of affiliation 1001, position 1002, time 1003, position information 1004, and operation 1005 during policy application. In the present embodiment, in the position information 1004, managerial position information is recorded.

The management server 806, upon reception of malware detection information from any of the client machines 803 and 811, refers to the security policy database 809 and selects, as a candidate, a security policy (operation 1005 during policy application) registered with respect to the combination of the affiliation 1001 and position 1002 of the user including the current time for policy delivery, time of policy delivery 1003, and position information 1004. At this point in time, the security policy cannot be determined because refinement using the position information is yet to be performed.

If the combination of the time 1003, affiliation 1001, position 1002, and position information 1004 including the current time for policy delivery is not registered in the security policy database 809, the management server 806 assumes that the operation 1005 during policy application is "prohibit network connection", and delivers the policy to all of the client machines being managed. The administrator of the management server 806 may set the operation 1005 during policy application for each combination of affiliation 1001, position 1002, time 1003, and position information 1004, and may modify or delete data after the setting.

(2-4) Processing Operation

Figure 11:
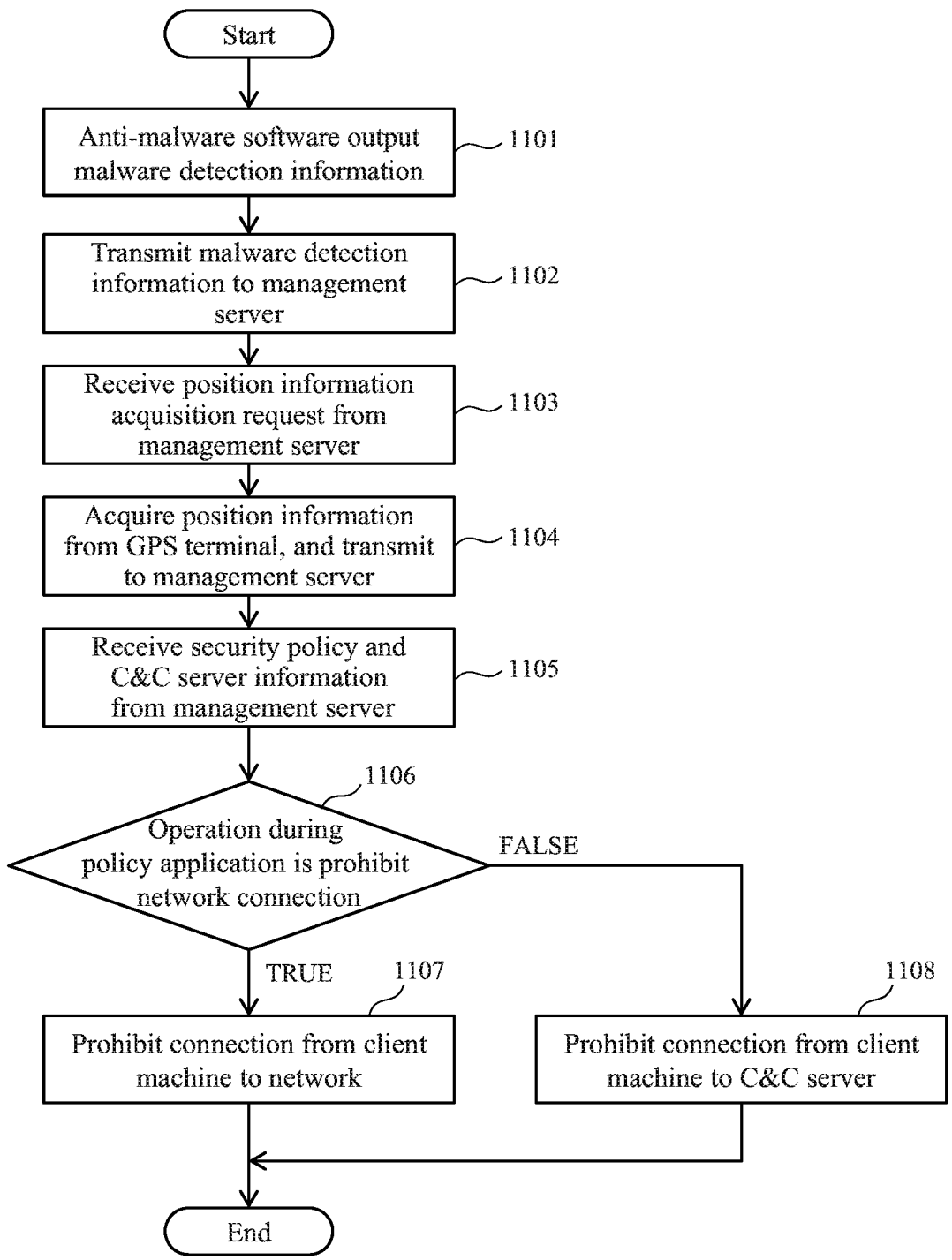
FIG. 11 is a flowchart for describing a processing procedure for a client machine during malware infection (the second embodiment).

The operation upon startup of the client machine is basically the same as in the first embodiment. Accordingly, in the following, only the operation during malware infection will be described. FIG. 11 illustrates a processing procedure performed by the client machine 803 infected with malware. Malware infection is detected by the anti-malware software 104 running in the client machine 803. Upon detection of malware infection, the anti-malware software 104 outputs malware detection information (step 1101). Then, the client processing unit 814 of the client machine 803 transmits the malware detection information to the management server 806 (step 1102).

Thereafter, the client processing unit 814 receives a position information acquisition request from the management server 806 (step 1103). The client processing unit 814 acquires position information from the GPS terminal 805, and transmits the acquired position information to the management server 806 (step 1104).

The client processing unit 814 then receives a security policy and C&C server information from the management server 806 (step 1105). The client processing unit 814 herein determines whether the operation during policy application included in the received security policy is "prohibit network connection" or "prohibit C&C server connection" (step 1106).

If the operation during policy application is "prohibit network connection", the client processing unit 814 severs connection with the network 102 and isolates itself from the network (step 1107). On the other hand, if the operation during policy application is "prohibit C&C server connection", the client processing unit 814 prohibits connection only to the address of the C&C server 101 included in the received C&C server information (step 1108). In the client machine 811 not infected with malware, the operation subsequent to step 1103 is performed.

Figure 12:
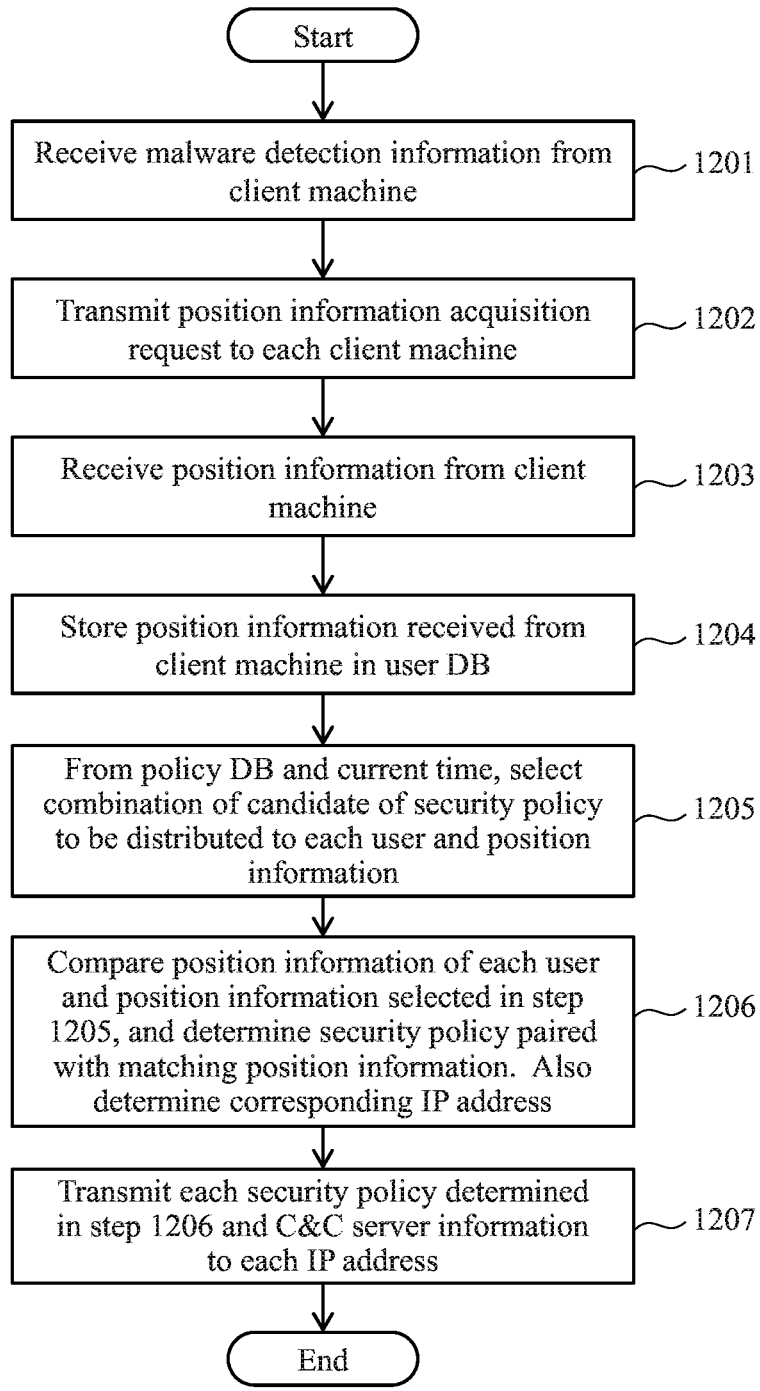
FIG. 12 is a flowchart for describing a processing procedure for a management server during malware infection (the second embodiment).

FIG. 12 illustrates a processing procedure performed by the management server 806 notified of malware infection. The server processing unit 815 receives malware detection information from the client machine 803 (step 1201). The malware detection information herein is the malware detection information transmitted in step 1102.

The server processing unit 815 then transmits a position information acquisition request to the client machines 803 and 811 (step 1202). That is, the server processing unit 815 transmits the position information acquisition request not only to the client machine 803 that has detected malware infection, but to all of the client machines being managed. Thereafter, the server processing unit 815 receives position information from the client machines 803 and 811 (step 1203). The position information is the position information transmitted in the step 1104. The server processing unit 815 stores the received position information in the user database 807 (step 1204).

The server processing unit 815 then searches the policy database 809 on the basis of the current time for policy delivery, and selects a combination of a security policy (operation 1005 during policy application) registered with respect to the user having the time 1003 including the current time, and the position information 1004 (step 1205).

The server processing unit 815 compares the position information 1004 of the user corresponding to the security policy selected in step 1205 with the position information 905 registered in the user database 807, and identifies the attribute and security policy of the matching user (i.e., the user who satisfies the conditions of both time 1003 and position information 1004). Further, the server processing unit 815 determines from the user database 807 the IP address of the user corresponding to the identified attribute and position information 905 (step 1206).

Thereafter, the server processing unit 815 transmits the corresponding security policy and C&C server information to the determined IP address (step 1207). The security policy and C&C server information are the security policy and C&C server information that the client machine received in step 1105.

(2-5) Summary

Also in the case of the information leakage prevention system 200, even in a network that does not include a firewall device or a relay device, information transmission from the client machines 803 and 811 to the C&C server 101 can be blocked, or the client machines 803 and 811 can be isolated from the network 102. In addition, the security policy (operation during policy application) to be applied to the client machines 803 and 811 can be determined by combining the position information with the user affiliation and position and the time of policy delivery. That is, it is possible to apply a more complex, or more flexible, security policy than in the case of the first embodiment.

(3) Third Embodiment (3-1) System Configuration

In the present embodiment, a system will be described in which the security policy is determined by taking into consideration the number of network administrators in attendance, and network connection of the client machine or access to the C&C server is controlled to prevent information leakage. In the present embodiment, it is contemplated that the network administrators include all of the staff members of the systems department, and all of the managerial staff members of various departments.

Figure 13:
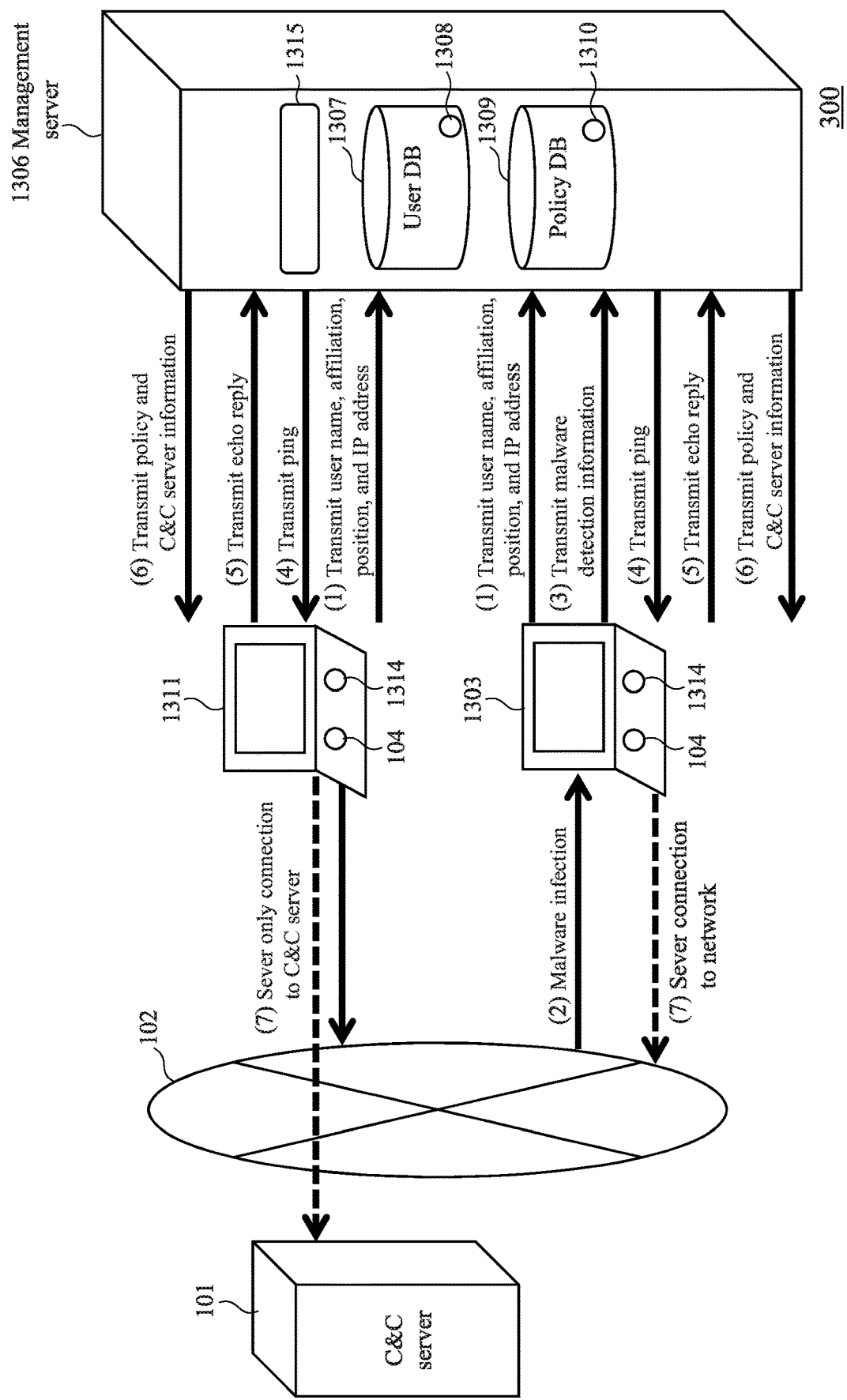
FIG. 13 is a diagram illustrating an overall configuration of a system according to the third embodiment.

FIG. 13 illustrates the overall configuration of an information leakage prevention system 300 according to the present embodiment. In FIG. 13, portions corresponding to those of FIG. 1 are designated with identical or similar reference signs. As will be appreciated from FIG. 13, the basic configuration of the information leakage prevention system 300 is the same as that of the information leakage prevention system 100 according to the first embodiment.

Each of client machines 1303 and 1311 has a computer as a basic configuration and is constituted by a CPU, a RAM, a ROM, a hard disk device, a network interface and the like. In the present embodiment, the client machines 1303 and 1311 implement the anti-malware software 104 and a client processing unit 1314 of which the functions are provided through the execution of a program by the CPU.

The client processing unit 1314 provides, through the execution of a program by the CPU, a user information transmission function, an attendance information processing function, a malware detection information transmission function, and a network control function. The functions are the same as those of the first embodiment with the exception of the attendance information processing function. The attendance information processing function provides the function of transmitting, upon reception of an attendance information transmission request (ping) from the management server 1306, a response (echo reply) to the management server 1306 if the PC is in operation.

The management server 1306 has a computer as a basic configuration and is constituted by a CPU, a RAM, a ROM, a hard disk device, a network interface and the like. To the management server 1306, a display device may be connected, as needed. In the present embodiment, the management server 1306 implements a user database (database) 1307, a security policy database (database) 1309, and a server processing unit 1315.

The server processing unit 1315 provides, through the execution of a program by the CPU, a user information management function, an attendance information management function, a security policy management function, and a security policy transmission function. The functions are the same as those of the first embodiment with the exception of the attendance information management function. The attendance information management function provides the function of transmitting, upon reception of malware detection information, a ping to all of the client machines 1303 and 1311 being managed. The attendance information management function provides the function of determining, upon reception of a response to the ping (echo reply), whether the user of the client machines 1303 and 1311 as the source of transmission is network administrator, and, if network administrator, registering attendance information in the user database 1307.

In the present embodiment, the security policy transmission function, upon reception of a response (echo reply) from all of the client machines 1303 and 1311 to which the ping has been transmitted, or in the event of time-out, extracts the C&C server information from the received malware detection information, and counts the number of network administrators in attendance from the data 1308 stored in the user database 1307. In the present embodiment, the security policy transmission function, on the basis of the current time for policy delivery and the calculated number of network administrators, selects a combination of affiliation and position matching the conditions, and selects from the security policy database 1309 a security policy to be applied with respect to the combination. Further, in the present embodiment, the security policy transmission function extracts from the user database 1307 an IP address corresponding to the combination of affiliation and position corresponding to the selected security policy, and transmits the selected security policy and C&C server information to the IP address.

(3-2) Configuration of User Database

FIG. 14 illustrates a structure example of the data 1308 stored in the user database 1307. The user database 1307 includes the data items of user name of each user 1401, affiliation 1402, position 1403, IP address 1404 of client machine, and attendance information 1405. The information other than the attendance information 1405 is transmitted, upon startup, from the client machines 1303 and 1311 to the management server 1306 and stored in the user database 1307 by the management server 1306.

If the received user name 1401 is already registered in the user database 1307, the management server 1306 overwrites the affiliation 1402, position 1403, and IP address 1404 linked with the existing user name 1401 with the newly received information. If the received user name 1401 is not registered in the user database 1307, the management server 1306 stores the received user name 1401, affiliation 1402, position 1403, and IP address 1404 in a new row.

The management server 1306, upon reception of an echo reply to the transmission of ping, searches the user database 1307 using the IP address 1404 that is the ping transmission destination, and, if the position 1403 of the user with the matching IP address 1404 is section chief or above, stores "attendance" in the attendance information 1405. The function is performed by the attendance information management function.

Because the client machines 1303 and 1311 transmit user information to the management server 1306 upon startup and upon IP address modification, it is contemplated that the IP address 1404 as the ping transmission destination is stored in the user database 1307 without fail, and the case in which the IP address 1404 as the ping transmission destination is not stored in the user database 1307 is not contemplated.

(3-3) Configuration of Security Policy Database

FIG. 15 illustrates a structure example of data 1310 stored in the security policy database 1309. The security policy database 1308 includes the data items of affiliation 1501, position 1502, time of policy delivery 1503, the number of network administrators in attendance 1504 necessary for policy application, and operation during policy application 1505.

The management server 1306, upon reception of an echo reply from all of the ping transmission destinations or in the event of time-out after receiving malware detection information from any of the client machine 1303 and 1310, counts the number of network administrators in attendance from the user database 1307. The management server 1306, on the basis of the number of network administrators counted from the user database 1307 and the current time for policy delivery, refers to the security policy database 1309 and selects the affiliation 1501, position 1502, and the security policy to be applied (operation during policy application 1505) that match the conditions.

If a combination of the affiliation 1501, position 1502, time 1503, and the number of administrators in attendance 1504 that includes the current time for policy delivery time 1503, and the number of administrators in attendance 1504 is not registered in the security policy database 1309, the management server 1306 assumes that the operation during policy application 1505 is "prohibit network connection", and delivers the policy to all of the client machines being managed. The administrator of the management server 1306 can set the operation during policy application 1505 for each combination of the affiliation 1501, position 1502, time 1503, and the number of administrators in attendance 1504, and may modify or delete data even after the setting.

(3-4) Processing Operation

Figure 16:
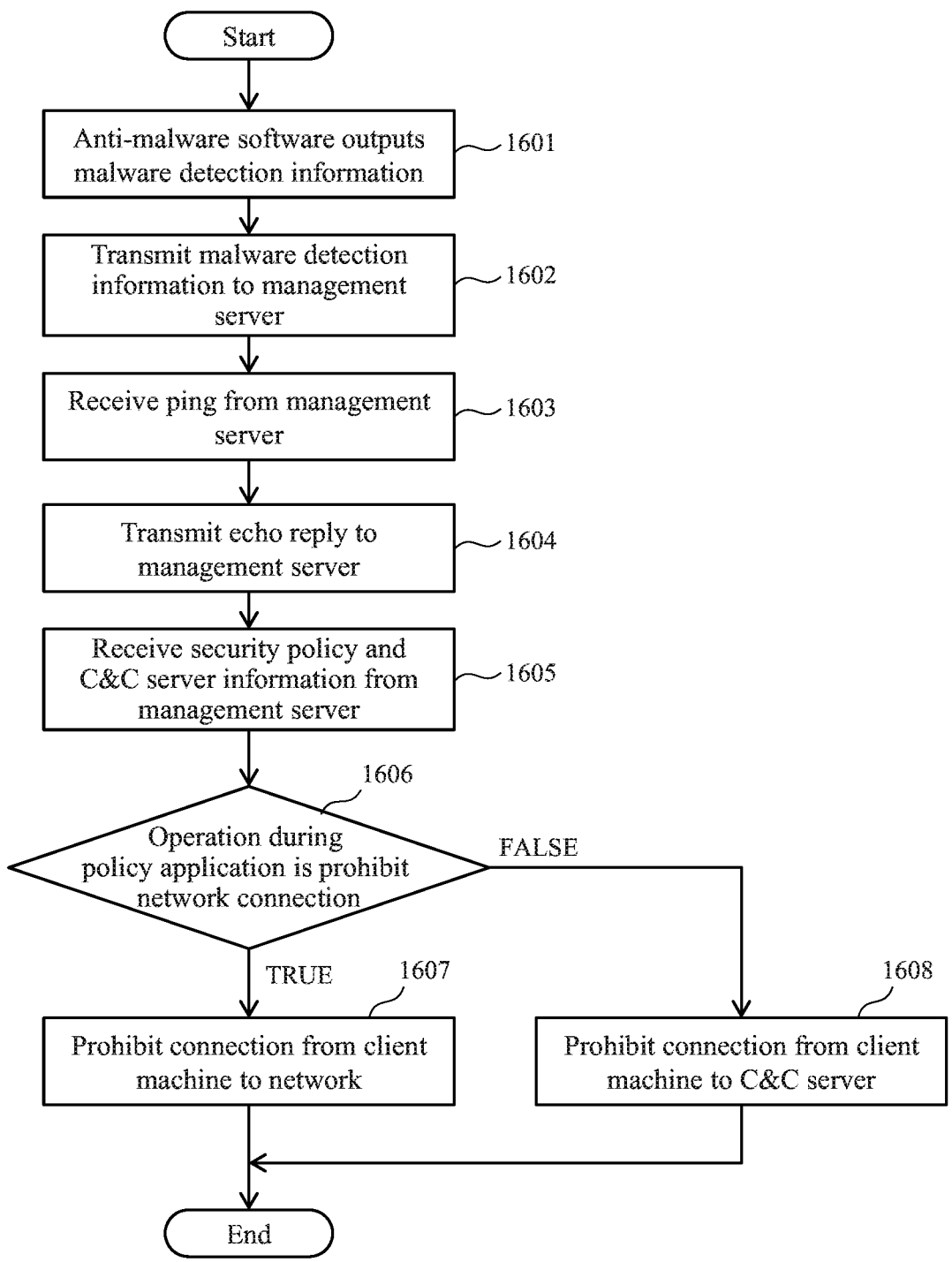
FIG. 16 is a flowchart for describing a processing procedure for a client machine during malware infection (the third embodiment).

The operation upon startup of the client machine is basically the same as that of the first embodiment. Accordingly, in the following, only the operation during malware infection will be described. FIG. 16 illustrates a processing procedure performed by the client machine 1303 infected with malware. Malware infection is detected by the anti-malware software 104 running in the client machine 1303. Upon detection of malware infection, the anti-malware software 104 outputs malware detection information (step 1601). Then, the client processing unit 1314 of the client machine 1303 transmits the malware detection information to the management server 1306 (step 1602).

Thereafter, the client processing unit 1314 receives a ping from the management server 1306 (step 1603). The client processing unit 1314 transmits an echo reply to the management server 1306 (step 1604).

The client processing unit 1314 then receives a security policy and C&C server information from the management server 1306 (step 1605). In this case, the client processing unit 1314 determines whether the operation during policy application included in the received security policy is "prohibit network connection" or "prohibit C&C server connection" (step 1606).

If the operation during policy application is "prohibit network connection", the client processing unit 1314 severs connection with the network 102 and isolates itself from the network (step 1607). On the other hand, if the operation during policy application is "prohibit C&C server connection", the client processing unit 1314 prohibits connection only to the address of the C&C server 101 included in the received C&C server information (step 1608). In the client machine 1311 not infected with malware, the operation subsequent to step 1603 is performed.

Figure 17:
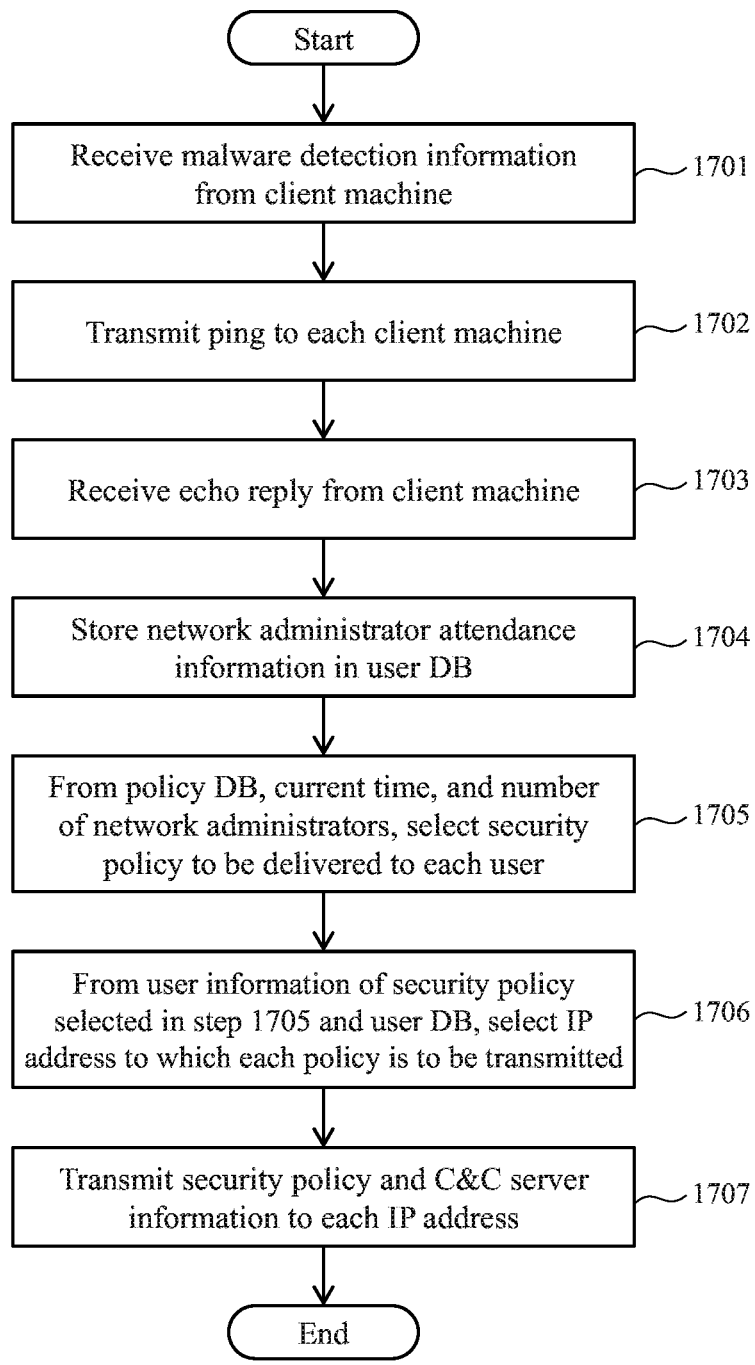
FIG. 17 is a flowchart for describing a processing procedure for a management server during malware infection (the third embodiment).

FIG. 17 illustrates a processing procedure performed by the management server 1306 notified of malware infection. The server processing unit 1315 receives malware detection information from the client machine 1303 (step 1701). The malware detection information is the malware detection information transmitted in step 1602.

Then, the server processing unit 1315 transmits a ping to the client machines 1303 and 1311 (step 1702). That is, the server processing unit 1315 transmits a position information acquisition request not only to the client machine 1303 that has detected malware infection but also to all of the client machines being managed. Thereafter, the server processing unit 1315 receives an echo reply from the client machines 1303 and 1311 (step 1703). The echo reply is the echo reply transmitted in step 1604. The echo reply may not be received from all of the client machines 1303 and 1311.

The server processing unit 1315 then stores the attendance information of the user of the client machine that has transmitted the echo reply in the user database 1307 (step 1704). It should be noted that the server processing unit 1315 registers only the attendance information of the network administrator in the user database 1307, and does not register the attendance information of other users.

The server processing unit 1315, on the basis of the user satisfying the combination of the current time for policy delivery and the number of network administrators in attendance, selects a security policy for delivery (step 1705). The server processing unit 1315 compares the user information (affiliation and position) of the user corresponding to the security policy selected in step 1705 with the user information (affiliation and position) in the user database 1307, and determines the IP address of the transmission destination of each security policy (step 1706).

Thereafter, the server processing unit 1315 transmits the corresponding security policy and C&C server information to the determined IP address (step 1707). The security policy and C&C server information are the security policy and C&C server information that the client machine received in step 1605.

(3-5) Summary

Also in the case of the information leakage prevention system 300, even in a network that does not have a firewall device or a relay device, information transmission from the client machines 1303 and 1311 to the C&C server 101 can be blocked, or the client machines 1303 and 1311 can be isolated from the network 102. The security policy (operation during policy application) applied to the client machines 1303 and 1311 can be determined by combining the number of network administrators in attendance with the user affiliation and position and the time of policy delivery. That is, it becomes possible to apply a more complex, or more flexible, security policy than in the case of the first embodiment.

(4) Other Embodiments

The present disclosure is not limited to the foregoing embodiments and may include various modifications. The foregoing embodiments have been described for facilitating an understanding of the present disclosure, and may not be provided with all of the configurations described. A part of one embodiment may be replaced with the configuration of another embodiment. The configuration of the other embodiment may be incorporated into the configuration of the one embodiment. With respect to a part of the configuration of each of the embodiments, addition, deletion, or substitution of a part of the configuration of the other embodiments may be made.

The configurations, functions, processing units, process means and the like that have been described above may be partly or entirely implemented by hardware based on an integrated circuit design, for example. The configurations, functions and the like may be implemented by a processor interpreting a program for performing each function (i.e., in terms of software). The programs, tables, and information such as files for implementing each function may be stored in a storage device such as a memory, a hard disk, or a solid state drive (SSD), or stored in a storage medium such as an IC card, an SD card, or a DVD. The control lines and information lines illustrated are those considered necessary for illustrative purposes, and do not necessarily represent all of the control lines or information lines required in a product. In practice, almost all of the configurations may be considered to be connected to each other.

REFERENCE SIGNS LIST

100 Information leakage prevention system
101 C&C server 101
102 Network
103, 111 Client machine
104 Anti-malware software
106 Management server
107 User database
109 Security policy database
114 Client processing unit
115 Server processing unit
200 Information leakage prevention system
803, 211 Client machine
806 Management server
807 User database
809 Security policy database
814 Client processing unit
815 Server processing unit 300 Information leakage prevention system
1303, 1311 Client machine
1306 Management server
1307 User database
1309 Security policy database
1314 Client processing unit
1315 Server processing unit

The invention claimed is:

1. An information leakage prevention system comprising:
a plurality of client terminals, wherein each client terminal of the plurality of client terminals includes a client processing unit; and
a management server which controls accesses from the plurality of client terminals to a Command & Control server (C&C server) and a network, wherein the management server comprises:
 a user database which stores information concerning a plurality of users of the plurality of client terminals;
 a security policy database which stores a plurality of security policies for the plurality of users of the plurality of client terminals, wherein each security policy of the plurality of security policies is assigned to each attribute of each user of the plurality of users, each attribute includes an affiliation and position of a corresponding user and a predetermined time period for delivery of a security policy that corresponds to the corresponding user;
 and a server processing unit,
wherein upon detecting a malware infection by a client terminal of the plurality of client terminals, the client terminal transmits malware detection information including C&C server information and information of a user of the client terminal to the management server;
wherein in response to receiving the malware detection information, the management server:
 searches the security policy database, based on a time of delivery of the malware detection information and predetermined time period of delivery for each of the plurality of security policies;
 selects, using the server processing unit, at least one security policy of the plurality of security policies stored in the security policy database that corresponds to the time of delivery of the malware detection information;
 transmits, using the server processing unit, the at least one security policy selected to at least one client terminal;
wherein in response to receiving the at least one security policy selected, the at least one client terminal prohibits connection from the at least one client terminal to the network if the at least one security policy selected prohibits connection to the network, and prohibits connection from the at least one client terminal to the C&C server if the at least one security policy selected prohibits connection to the C&C server.

2. The information leakage prevention system according to claim 1, wherein the server processing unit further includes:
 a user information management function unit which stores the information concerning the plurality of users of the plurality of client terminals acquired from the user database;
 a security policy management function unit which searches the security policy database based on the time of delivery of the malware detection information, and selects the at least one security policy corresponding to the time of delivery of the malware detection information, the at least one security policy selected is associated with a combination of affiliation and position of at least one user of the at least one client terminal; and
 a security policy transmission function unit which searches the user database based on the affiliation and the position of the at least one user corresponding to the selected at least one security policy selected to acquire an IP address of the at least one client terminal as a transmission destination, and transmits the at least one security policy selected and C&C server information to the at least one client terminal having the acquired IP address.

3. The information leakage prevention system according to claim 1, wherein the server processing unit includes:
 a user information management function unit which stores the information concerning the plurality of users of the plurality of client terminals acquired from the user database;
 a physical location information management function unit which, upon reception of the malware detection information from the client terminal, acquires physical location information by requesting transmission of the physical location information from the client terminal, and stores the acquired physical location information in the user database; and
 a security policy management function unit which searches the security policy database based on the time of delivery of the malware detection information, selects, from among selected security policy candidates, a security policy corresponding to physical location information matching the acquired physical location information stored in the user database, searches the user database based on affiliation and position corresponding to the selected security policy to acquire an IP address of at least one client terminal as a transmission destination, and transmits the security policy and C&C server information to the at least one client terminal having the IP address.

4. The information leakage prevention system according to claim 1, wherein the server processing unit includes:
 a user information management function unit which stores information concerning the plurality of users of the plurality of client terminals acquired from in the user database;
 an attendance information management function unit which acquires user attendance information based on a presence or an absence of response to an attendance information transmission request transmitted to the at least one client terminal, and which stores the user attendance information in the user database; and
 a security policy management function unit which searches the user database to calculate a number of administrators in attendance, searches the security policy database based on the calculated number of administrators in attendance and the time of delivery of the malware detection information, selects a security policy corresponding to a combination of affiliation and position of the at least one user, searches the user database based on the affiliation and the position corresponding to the selected security policy, acquires an IP address of the at least one client terminal as a transmission destination, and transmits the security policy and C&C server information to the at least one client terminal having the IP address.

5. The information leakage prevention system according to claim 1, wherein each client processing unit includes:

a user information transmission function unit which transmits information of a user of a client terminal to the management server;

a malware detection information transmission function unit which transmits to the management server malware detection information, the malware detection information including the C&C server information and information of a user of a client terminal infected with malware;

a security policy reception function unit which acquires the at least one security policy and the C&C server information from the management server; and a network control function unit which prohibits connection from a client terminal to the network or the C&C server based on the at least one security policy.

6. The information leakage prevention system according to claim 5, wherein each client processing unit further includes a physical location information processing function unit which, upon reception of a physical location information transmission request from the management server, acquires physical location information of its client terminal and transmits the physical location information acquired to the management server.

7. The information leakage prevention system according to claim 5, wherein each client processing unit further includes an attendance information processing function unit which transmits to the management server a response to an attendance information transmission request received from the management server.

8. An information leakage prevention method including a plurality of client terminals and a management server, the method comprising:

storing, by the management server, in a security policy database a plurality of security policies for a plurality of users of the plurality of client terminals, wherein each security policy of the plurality of security policies is assigned to each attribute of each user of the plurality of users, each attribute includes an affiliation and position of a corresponding user and a predetermined time period for delivery of a security policy;

defining, by the management server, a connection for each attribute of each user based on a time of delivery of malware detection information and a predetermined time period of delivery for each of the plurality of security policies;

transmitting, by a client terminal that has detected malware infection, to the management server, malware detection information including Command & Control server (C&C server) information and information of a user of the client terminal;

searching, by the management server that has received the malware detection information, in a security policy database for the plurality of security policies;

selecting, by the management server, at least one security policy of the plurality of security policies stored in the security policy database which has a predetermined time period of delivery of a policy corresponds to a time of delivery of the malware detection information;

transmitting, by the management server, the at least one security policy selected and the C&C server information to at least one client terminal;

receiving, by the at least one client terminal, the at least one security policy selected and the C&C server information from the management server; and prohibiting, by the at least one client terminal, connection from the at least one client terminal to a network if the at least one security policy selected prohibits connection to the network, and prohibiting, by the at least one client terminal, connection from the at least one client terminal to the C&C server if the at least one security policy selected prohibits connection to the C&C server.

9. The information leakage prevention method according to claim 8, further comprising:

requesting, by the management server that has received the malware detection information, transmission of physical location information from the client terminal;

acquiring, by the client terminal that has received the request for transmission of physical location information, physical location information of the client terminal and transmitting, by the client terminal, the physical location information acquired to the management server; and, storing, by the management server, the physical location information acquired received from the client terminal in the user database, wherein, the selecting by the management server the at least one security policy comprises: the management server selects, a security policy corresponding to position information matching the physical position information acquired stored in the user database.

10. The information leakage prevention method according to claim 8, further comprising:

transmitting, by the management server that has received the malware detection information, an attendance information transmission request to the at least one client terminal;

responding, by the at least one client terminal, to the attendance information transmission request received; and acquiring, by the management server, user attendance information based on a presence or an absence of the response, and storing, by the management server, the user attendance information in a user database, wherein, the selecting by the management server the at least one security policy comprises:

the management server searching the user database and calculates a number of administrators in attendance, and the time of delivery of the malware detection information, and selecting the at least one security policy corresponding to a combination of affiliation and position of at least one user, searching the user database based on the affiliation and the position corresponding to the selected security policy, acquiring an IP address of the at least one client terminal as a transmission destination, and transmitting the selected security policy and the C&C server information to the at least one client terminal having the IP address.

* * * * *